May 1, 1928.　　　　　　　　　　　　　　　1,667,752
P. H. THOMAS
REGULATING MEANS FOR SYSTEMS OF ELECTRICAL DISTRIBUTION
Filed Aug. 27, 1924
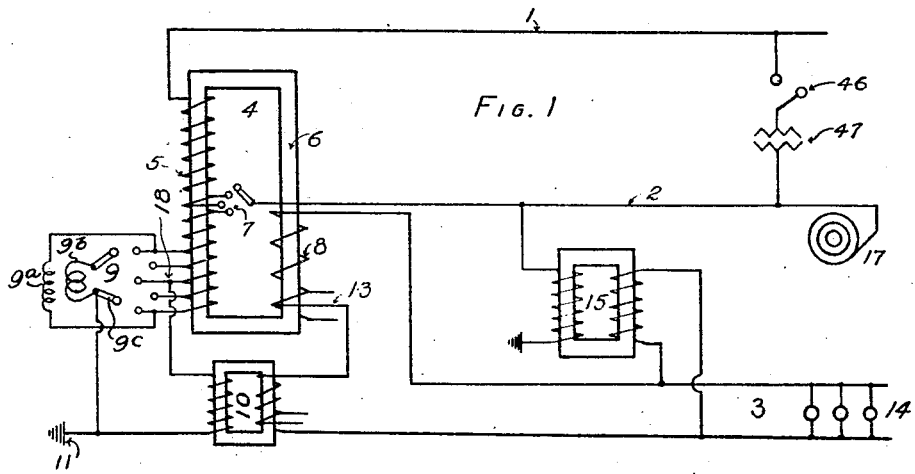
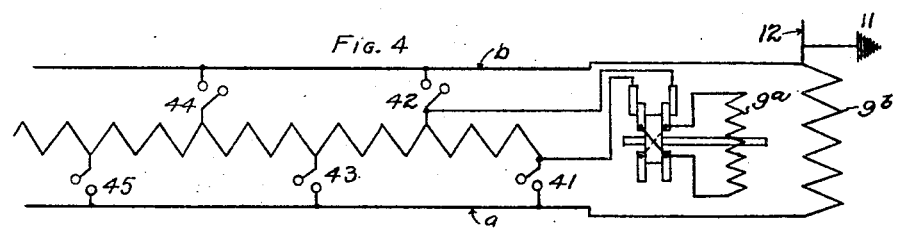
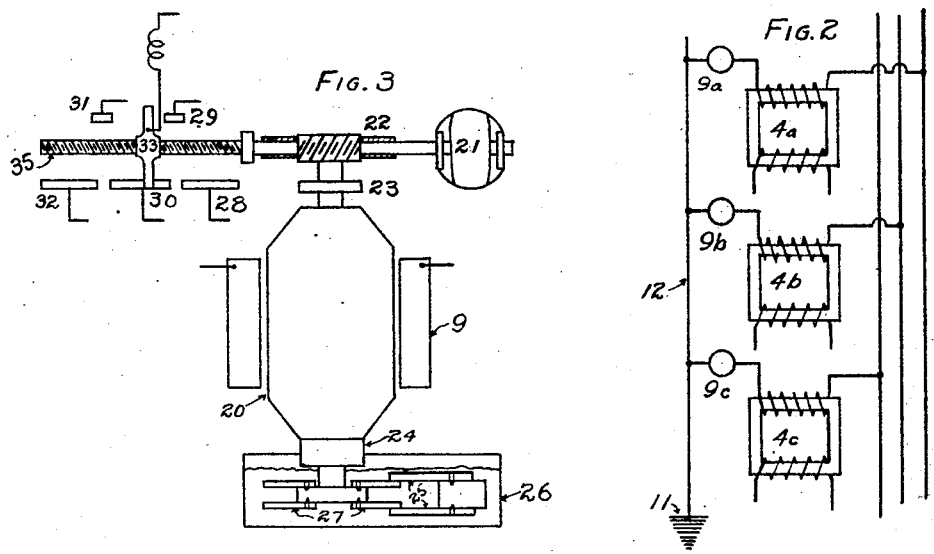
WITNESSES　　　　　　　　　　　　　　　　INVENTOR Patented May 1, 1928.

1,667,752

UNITED STATES PATENT OFFICE.

PERCY H. THOMAS, OF UPPER MONTCLAIR, NEW JERSEY.

REGULATING MEANS FOR SYSTEMS OF ELECTRICAL DISTRIBUTION.

Application filed August 27, 1924. Serial No. 734,434.

The purpose of the present invention is to provide a plan and a suitable apparatus for supplying electric power to local consumers from a high tension electric source and at the same time to supply power to or receive power from general distribution circuits connected at the same local point and to so regulate the relations of these elements as to preserve a suitable range of voltage and of current on each. My invention covers other features as well as will appear below, including a scheme for a step-up or step-down voltage regulator. While my invention is well suited to secure the results proposed in circuits such as those described, it will be useful also in other services and I wish to include such other services in my claims.

The inventive idea here described is applicable in a wide range of cases having the essential characteristics of a combination of one or more sources of supply of electric power with consumption circuits and involving variable winding ratios of transformers. My voltage regulator may be used separately from the other elements and when so used comes within the scope of this invention.

I have shown in Figures 1 and 2 a favorable embodiment of my invention. Figs. 3 and 4 show the application of my voltage regulator. Let 1, Fig. 1, be one phase of a high tension supply line, for example, of 220 kv. Let 4 be one phase of a step-down transformer or bank of transformers of which 6 is the magnetic core and 5 the high tension winding. One arrangement of the three phases is shown in Fig. 2, where 4$^a$, 4$^b$ and 4$^c$ are three transformers in the three phases of a three phase supply system. These may be either separate single phase transformers or three elements of a three phase transformer. The high tension transformer windings as shown are connected star and the neutral point may if desired be grounded, as at 11. From the point of view of insulation on the ends of the high tension windings that are connected together and for other reasons such grounding is usually desirable. As shown in Fig. 2, voltage adjusting devices, such for example as induction regulators, are inserted in the connections to the common bus 12 of the transformers 4$^a$, 4$^b$ and 4$^c$, as shown at 9$^a$, 9$^b$ and 9$^c$.

In Fig. 1, 2 represents one phase of a distributing line, taken here as a 110 kv. line and 15 a step-down transformer connected to that line and supplying a consumption circuit 3 feeding load devices 14. Energy may be received by the transformer 15 from the distribution line 2 from any suitable supply connected thereto as at 17 or through the transformer 4 from the high tension line 1, and the distribution line 2 may receive energy from the transformer 4. There may be a connection at a remote point between the high tension supply line 1 and the distribution line 2 as shown at 46 through a transformer 47.

The generator supplying the line 1 will operate in parallel with the source 17 by virtue of their connection through the transformer 4 if the usual precautions are taken and the drop in the line 2 between the source 17 and the transformer 4 will act as a certain cushion and the load and power factor distribution can be controlled to a reasonable degree by varying the point of connection of the line 2 to the winding 5 by the adjustable taps 7, or by other suitable means. For example, the connecting of the line 2 to a higher potential point in the winding 5, taken in connection with the control of the input of energy to the generator at 17 by governor or otherwise, may be made to improve the power factor on the line 2 and vice versa, when there is no connection between the lines at the switch 46.

To put this another way, the power that will be supplied by the source 17 over the line 2 to the consumption circuit 3, will be determined in accordance with well known laws by the setting of the governor on the prime mover of the source 17. But the voltage of the receiving end of the line 2, will be determined by the particular tap used at 7. Therefore, the power factor of the power in the line 2 must be such as to produce the terminal voltage at 7 with the particular load transmitted.

Raising the voltage of the end of the line 2 by connecting it to a higher tap at 7 means that there will be less drop in the line 2 from the generator 17 to the station at which the transformers 4 and 15 are located. Now if the governors of the prime movers remain unchanged at 17 the same amount of power will be supplied to the line 2 as before. This can be done with the higher voltage at 7 only by the raising of the power factor in the line 2 and a sufficient quantity of wattless out-of-phase current will flow from the line 1 through the transformer 4 to the line 2 to produce the power factor appropriate to the new voltage. This will be measured as lagging in the transformer 4 and greatly improves the transmission conditions in the line 2. If the power factor of the power in the line 2 were lowered without a change in the terminal voltage, this must be accompanied by a decrease in the power transmitted.

If the high tension supply and the distribution line 2 are connected at 46 the prime movers no longer have control of the distribution of power between the two lines, 1 and 2, but the current will divide between them according to the well known law of impedance, taking into account the unbalanced voltage resulting from any difference in the ratios of the transformers 4 and 47. However, for all practical purposes the adjustment of the point of connection of the distribution line 2 to the winding 5 at 7 will control the relative currents in the two lines and the power factor in the line 2, in substantially the same manner as above. This condition is favorable in actual practice because in nearly all cases the line and transformer resistances will be dominated by reactance and all currents will be substantially in phase.

Such an arrangement as that shown in Fig. 1, may be suitable where a new 220 kv. line is brought to a previously existing stepdown point in a 110 kv. distributing line.

To supply energy directly to the consumption circuit 3 from the supply line 1 in parallel with the transformer 15 in Fig. 1, a secondary winding 8 is provided in the transformer 4 which may often be directly connected in parallel to the secondary of the transformer 15. The auxiliary transformer to be described later may be then omitted if desired.

It is sometimes desirable, however, to provide means for supplying constant potential to the consumption circuit 3, regardless of the ordinary variations of potential on the line 1. This may be accomplished by inserting the voltage changing devices $9^a$, $9^b$ and $9^c$, in Fig. 2 and 9 of Fig. 1 in the leads of the high tension windings as shown. By adjusting the voltage changing device, the voltage of the consumption circuit 3 on the distribution circuit 2 may be kept constant in spite of changes in the voltage of the line 1.

This adjustment of the device 9 may be accomplished by hand or automatically by some suitable device, as for example, by a motor controlled by the voltage of the consumption circuit (or the voltage at any other point where it may be desired to keep the pressure constant) and acting to move the voltage changing device in one direction when the consumption circuit voltage is too low and in the other direction when it is too high, until the adjustment of the voltage changing device corrects the disturbance of the consumption circuit voltage. This correcting effect of such a voltage changing device is already well known. The voltage changing device may be put in the circuit of the secondary winding 8 as far as correcting the voltage of the circuit 3 is concerned, but will not then render the voltage of the distribution line 2 constant.

This operation may be described more in detail as follows: The voltage changing device 9, Fig. 1, is illustrated as an induction regulator as shown, its field winding or magnetizing winding being shown at $9^a$ and being connected across a suitable constant potential source as for example, any portion of the winding 5. Its series winding $9^b$ will be connected between the ground at 11 and any suitable tap of the winding 5, according to the particular voltage desired on the winding 8 or the line 2. The voltage of the line 1 will then be impressed upon that of the regulator series winding $9^b$ together with that portion of the winding 5 between the point of connection of $9^b$ and the line 1. Therefore, the volts per turn of the transformer 4 will be increased as the voltage absorbed by the device 9 is decreased or as the point of connection of the winding $9^b$ is moved nearer the line 1 and vice versa.

The switch on $9^c$ connected to the ground end of winding $9^c$ is used to maintain continuity of the circuit of the winding 5 when the point of connection of the other end of the winding $9^b$ is changed. The voltage absorbed by the winding $9^b$ may be negative or positive or may have any intermediate value according to the angular position of the rotor. The action is described more in detail in connection with Fig. 4.

It will thus be seen that the regulator winding $9^b$ will be stepped up or down from tap to tap, the voltage graduations between taps being secured by the gradual change of voltage produced by the operation of the regulator itself.

But such a variation of the voltage changing device will not affect the voltage of the secondary winding of the transformer 15 and that of the transformer 4 to the same extent and may in some cases disturb their parallel operation. In this case it may be desirable to correct this inequality which may be done for example, by the auxiliary transformer 10, Fig. 1. The primary of transformer 10 is connected in shunt to the voltage changing device so that the voltage impressed upon the primary of the transformer 10 is the voltage change caused by any change of the voltage changing device from the normal position at 18, Fig. 1. In the normal setting of the device 9, there is no voltage on the winding 9ᵇ and one end is connected to the tap 18. The secondary winding of transformer 10 is connected in series with the secondary of transformer 4 and if certain design conditions are properly fulfilled the result of the auxiliary transformer 10 will be to give the same voltages on the consumption circuit 3 from the secondaries of both transformers 4 and 15. The necessary design conditions may be expressed as follows:

1st—The number of turns in the winding 5 between the point of connection to the line 2 and the normal setting point 18 above referred to, multiplied by the ratio of secondary to primary turns in the transformer 15 is equal to the number of secondary turns in the transformer 4, that is the number of turns in the winding 8.

2nd—The ratio of the number of secondary to primary turns in the transformer 15 shall be the same as in the transformer 10. In addition, of course, the usual conditions as to proportioning of resistance and reactances should be observed as with all parallel operating transformers.

With the above stated conditions fulfilled the regulator 9 may be operated to give a constant voltage at 3, during variations of the voltage on the line 1, and yet the same normal voltage will be supplied at 3, both by the winding 8 and by the secondary winding of the transformer 15.

If the voltage of the line 1 is 220 kv. and that of line 2 be 110 kv. and the line 2 be connected to the middle of the winding 5, the winding 5 for this purpose being taken from its connection to the line 1 to as far as the normal point at 18, and if the ratio of turns in transformer 15 be 10, the specified design conditions are fulfilled if the number of turns in the winding 8 of transformer 4 is $\frac{1}{10}$ of the one half of the turns in the winding 5 and if the ratio of turns in the transformer 10 is 10. The no load voltage in the consumption circuit 3 is 11,000 volts in this case.

With other normal line voltages different numbers of turns in the different windings will be appropriate. A certain variation from ideal conditions, however, will be of little disadvantage when such variation may save cost or complication. For example, if the division of load between transformers 4 and 15 be made right when the line is fully loaded, a considerable departure on light loads is often of little consequence. This will often simplify or cheapen the cost of the installation.

Various loops are provided in the several transformers to provide adjustment, as for example at 13 in the winding 8.

Instead of causing the line 2 to be supplied directly from the winding 5, acting as an auto transformer, the line 2 may be supplied from a separate secondary winding like the winding 8, in which case no auxiliary transformer 10 is required.

The voltage changing device 9, Fig. 1, is of great value and will be further described.

As explained my invention operates to control the voltage on the consumption circuit 3 by introducing a potential in the primary circuit 5 of the step-down transformer 4. When once such regulating potential has been introduced to establish a desired voltage in the consumption circuit 3, with some definite line voltage, this voltage condition should remain substantially constant regardless of the amount of power taken, this ensuring a constant potential at the consumption circuit 3 regardless of a varying load. For example, such regulating potential could not be secured by introducing a series reactance in place of the regulator for such a regulated voltage would be changed by changing load. Any form of device giving a potential for regulating purposes independent of power taken may be used in my invention. I have recommended for some cases the wellknown induction regulator, with a varying magnetic interlinkage between primary and secondary windings according to the position of the rotor.

However, the above described regulating potential, while independent of power flow must be adjustable at will to enable various adjustments to be made to correct for all reasonable variations of line potential. It is desirable in many cases that this regulating potential, or the potential changing device be automatically controlled so that any change in whatever quantity may be taken as the quantity to be controlled, (for example the secondary voltage of the main transformer) may be immediately corrected by the action of the system.

As a matter of economy or convenience the regulator may be arranged to be connected progressively to several taps in the transformer as shown in Fig. 1, the net effect being to give the device the effect of a device of much greater range. In this case the device itself need have merely the voltage range from one tap to another.

In such a case the action would be as follows: Starting in the normal position with the regulator at 18, a small variation in the line voltage may be assumed which will call for the introduction of a certain correction by the regulating device and the device will develop the necessary regulating voltage. If now the extent of the line voltage variation be great enough the amount of the voltage developed by the regulating device will be just equal to the voltage between the tap 18 and the next tap. When this happens the series winding of the regulating device may be transferred to this second tap in which case it may go on producing voltage for regulating purposes up to its limit. When, however, the voltage between the next two taps is reached the regulator may then be removed to the second tap and be free to supply further regulating potential. This action is described more in detail hereinafter in connection with Fig. 4.

A novel method of arranging such a voltage changing device to pass from tap to tap is a feature of this invention and is shown in Fig. 3 and Fig. 4.

In these figures, 20 represents a voltage changing device such as an induction type regulator, here shown with a revolving field. It may be either a single phase regulator, or a polyphase regulator. A control motor is shown at 21, driving the rotor through the worm gear 22. The rotor is mounted in bearings 23 and 24, the latter being a thrust bearing when the shaft is vertical.

On the lower end of the shaft of the rotor is a double pole reversing switch, which may consist of two pairs of half plates, 27, on an insulating hub, cross connected, and receiving current from the brushes 25 which are connected to a source of constant potential.

In Fig. 4 I have shown the electrical connections of a regulator such as the regulator 9 of Fig. 1 and of a transformer winding corresponding to the ground end of the transformer winding 5 of Fig. 1. The taps on the transformer winding 5 of Fig. 4 correspond to the taps of the ground end of the transformer winding 5 of Fig. 1 and are marked 41 to 45 inclusive. For purposes of identification I have marked the primary or magnetizing winding of the regulator which I have shown as an induction regulator as $9^a$ in Fig. 4 and the series winding, or the winding of the variable voltage, as $9^b$. The magnetizing winding $9^a$ of Fig. 4 is connected through the reversing switch to any portion of the transformer winding 5 as for example, the portion between the taps 41 and 42 as shown. As the parts of this regulator are well known, no special description is required. As already explained the voltage in the transformer winding 5 is modified both by a voltage in the regulator winding $9^b$ and by any change in the tap to which the winding $9^b$ is connected. Taps 42 and 44 as shown, are used to carry the main current of the winding 5 by way of the lead $b$ during the period when the lead $a$ is being changed from one tap to another.

The action of this regulator, which is used in connection with the primary or secondary of a transformer, for example as shown at 9 in Fig. 1, is as follows: Let "$a$" Fig. 4 be one end of the series winding of the regulator, and let "$b$" be the other end, which is connected to ground, as at 11, or to the two other phases of the transformer as at 12. Assuming that Fig. 4 represents diagrammatically the connections, the starting position, giving the lowest voltage on a secondary winding, as for example 8, Fig. 1, is found when the "$a$" end of the series winding of the regulator is connected to the end 41 of the transformer winding 5 and the position of the regulator rotor and the connections and the position of the reversing switch are such that the voltage of the series winding acts in the same direction as the counter E. M. F. in the winding 5. If this position of the regulator rotor be called front and the setting of the reversing switch of the regulator be called direct, the successive changes required to pass gradually from minimum secondary voltage to maximum secondary voltage are shown in the following table.

| Connections | Position of reversing switch | Position of regulator rotor | Effect in transformer circuit |
|---|---|---|---|
| a  b | | | |
| 41 open | Direct | Max. front | Buck. |
| 41 open | Direct | Max. front to max. back | Buck to boost. |
| 41 42 | Direct | Max. back | Boost. |
| Open 42 | Direct | Max. back | |
| Open 42 | Reverse | Max. back | |
| 43 42 | Reverse | Max. back | Buck. |
| 43 open | Reverse | Max. back | Buck. |
| 43 open | Reverse | Max. back to max. front | Buck to boost. |
| 43 44 | Reverse | Max. front | Boost. |
| Open 44 | Reverse | Max. front | |
| Open 44 | Direct | Max. front | |
| 45 44 | Direct | Max. front | Buck. |
| 45 open | Direct | Max. front | Buck. |
| 45 open | Direct | Max. front to max. back | Buck to boost. |

The first step is the rotation of the regulator rotor from the front to the back position which reverses the direction of the voltage in the series winding gradually raising the voltage in the winding 8. The taps on the transformer should be so chosen as to cause the voltage between consecutive taps to equal the maximum voltage in the regulator series winding. Then the tap 42 in the winding 5 will be at the same potential as the terminal "$b$", with the rotor in the back position and "$b$" may be connected to 42 without disturbance. Then the contact of "$a$" with 41 is broken and the reversing switch changed in position reversing the direction of the voltage in the series winding. This has no effect in the main circuit since "$b$" is connected direct to ground and "$a$" is open. However, now "$a$" will be at the potential of the tap 43 and should be connected thereto. Then the connection at 42 may be opened and the rotor rotated from the back position to the front position again raising the potential in the secondary winding 8. "$b$" may now be connected to tap 44 and "$a$" disconnected from 43 and the reversing switch again changed, whereupon "$a$" may be connected to tap 45 and "$b$" disconnected from 44. By revolving the rotor again to the back position the maximum voltage in winding 8 is obtained.

The process may be reversed as desired or stopped at any point and reversed or see-sawed backward and forward.

As already explained these movements may be automatically controlled by controlling the motions of the control motor 21.

If more taps be provided in the transformer winding 5 a wider range of voltage change may be obtained by the same regulator which merely has to go round and round, one revolution for each 4 taps.

The connections from the series winding terminals "a" and "b" to the taps in the transformer winding may be conveniently made by remote control breakers under oil. In fact on large regulators I prefer to put the reversing switch Fig. 3 in an oil tank as at 26.

The opening and closing of the remote control breakers at the transformer taps 41 to 45 may be controlled by contacts such as shown at 28, 29, 30, 31 and 32, Fig. 3 which correspond to taps 41 and 45 of Fig. 4. A slider 33 making contact on these contacts in turn with a suitable source of supply for operating the oil breakers may be carried by a nut and screw on an extension of the shaft 35 of the motor 21. By properly spacing the blocks and co-ordinating with the worm and worm wheel, the proper relative time of action between the breakers and the reversing switch can readily be secured as will be understood by those skilled in the art.

When the slider touches any of the contacts it actuates the operating mechanism of the breaker corresponding and closes it. When the contact is broken by the movement of the slider the breaker opens automatically.

It will be noted that in none of these changes is it necessary to break a contact carrying the main current except when a ready parallel path to take the current is provided. By putting all breakers handling the main current and the reversing switch under oil, large capacity regulators, and repeated operation become feasible and through the use of many transformer taps very large amounts of power can be readily controlled by small capacity regulators as the energy represented by the change between taps is small.

I claim as my invention.

1. In a system of electrical distribution, the combination of a high voltage supply line, a distributing circuit and a local consumption circuit, these two circuits being of different voltage, with a transformer connecting said high tension supply line both to said local consumption circuit and said distributing circuit, means for maintaining a constant voltage in said consumption circuit and means for varying the relative voltages in the distribution and the consumpton circuits.

2. In a system of electrical distribution, the combination of a high tension line, a second line of different voltage and a local consumption circuit, with a transformer interconnecting the two lines and the local circuit for the transfer of power and means for maintaining the voltage of the local consumption circuit constant regardless of variations in the voltage of one of the lines and means for simultaneously maintaining constant the voltage of the second line.

3. In a system of electrical distribution, two transmission lines of different voltages, feeding a local consumption circuit, distant sources of energy connected to said lines and a transformer interconnecting said lines, with means for establishing a constant voltage in said consumption circuit from one of said lines and means for maintaining a constant voltage on the other line relative to said consumption circuit voltage.

4. In a system of electrical distribution, two transmission lines of different voltages, feeding a local consumption circuit, distant sources of energy connected to said lines and a transformer interconnecting said lines, with means for establishing from one of said lines a constant voltage in the consumption circuit and in the other line simultaneously.

5. In a system of electric distribution the combination of a high tension supply line, a second supply line at lower voltage and a local consumption circuit with a transformer having suitable windings, feeding power from said first mentioned supply line to said local consumption circuit and a connection for receiving power through said transformer from said second mentioned supply line and a series of taps co-operating therewith in the windings of said transformer for controlling the power factor of current in said second mentioned supply line.

6. In a system of electrical distribution, the combination of a high voltage supply line, a distributing circuit and a local consumption circuit, with a transformer connecting said high voltage supply line with the local consumption circuit and with said distributing circuit, together with means for maintaining the voltage of the distribution circuit constant during variations of the high voltage supply and means for simultaneously maintaining the voltage of the local consumption circuit constant.

7. In a system of electrical distribution, the combination of a high voltage supply line, a distributing circuit and a local consumption circuit, with a transformer connecting said high voltage supply line with the local consumption circuit and with said distributing circuit, together with means for maintaining the voltage of the distribution circuit constant during variations of the high voltage supply and means for simultaneously maintaining the voltage of the local consumption circuit constant, said first named means including a device for automatically changing the counter E. M. F. in said transformer circuit and said last named means including a voltage adjusting transformer responsive to the changes in said counter E. M. F.

8. In a system of electrical distribution, the combination of a high voltage supply line, a distributing circuit and a local consumption circuit, with a transformer connecting said high voltage supply line with the local consumption circuit and with said distributing circuit, together with means for maintaining the voltage of the distribution circuit constant during variations of the high voltage supply and means for simultaneously maintaining the voltage of the local consumption circuit constant, said first named means including an induction regulator in series with said transformer and said last named means including a transformer for impressing a corrective voltage upon current fed to said consumption circuit from said first named transformer.

9. The combination of a high voltage line of fixed potential, a distribution circuit, a transformer connecting said line and said circuit, a generator of fixed potential connected to said circuit at a remote point and means for controlling the power factor of the current in said circuit, said means consisting of means for connecting said distribution circuits to points of higher or lower potential in said transformer.

10. In a system of electrical distribution the combination of two transmission lines one having a higher normal voltage than that of the other, interconnected for the interchange of energy at a certain point, means for supplying energy to these lines at said point, and a transformer at a point remote from said first named point, supplying a local load from said lines, the line of lower voltage being connected to an intermediate point in said transformer, together with means for controlling the power factor in said lower voltage line, consisting of means for varying said intermediate point of connection.

11. In a system of electrical distribution, a step-down transformer having a primary winding and a secondary winding connected to a consumption circuit, a distribution transformer having its primary winding connected to an intermediate point in said primary winding and its secondary winding connected to the consumption circuit and a regulator co-operating with a series of taps in the primary winding of said step-down transformer to vary the point of connection at one end of said primary winding from a normal point, together with a corrective transformer having its primary connected between the actual point of connection of said winding and the normal point thereof, and its secondary in the circuit of the secondary of the step-down transformer, the ratios of turns in the various transformers conforming to the following rule: 1st—the ratio of the turns of the secondary of the distribution transformer to the turns of its primary times the number of turns in the primary winding of the step-down transformer between the point of connection to the primary of the distribution transformer and said "normal" point shall equal approximately the number of turns in the secondary winding of the step-down transformer, and 2nd—the ratio of the primary and secondary turns in the corrective transformer shall be the same as that in the distribution transformer.

12. In a system of electrical distribution, a high tension supply line, a transformer including a normal primary winding connected to said line and a secondary winding feeding a consumption circuit in combination with regulating means for the voltage of said consumption circuit consisting of means for inducing a controllable voltage in series with said normal primary winding and a second transformer connected to said primary winding at an intermediate point and to said consumption circuit together with means for equalizing variations in the voltage of the secondary winding of said first named transformer, caused by the operation of said regulating means, consisting of means for inducing in the circuit of said secondary a voltage proportional to said induced voltage in the first named primary circuit.

13. In a system of electrical distribution, a high tension supply line, a transformer including a normal primary winding connected to said line and a secondary winding feeding a consumption circuit in combination with regulating means for the voltage of said consumption circuit consisting of means for inducing a controllable voltage in series with said normal primary winding and a second transformer connected to said primary winding at an intermediate point and to said consumption circuit together with means for equalizing variations in the voltage of the secondary winding of said first named transformer, caused by the operation of said regulating means consisting of a transformer excited from said induced voltage in the first named primary and connected in series with the secondary winding of said first named transformer.

14. In a system of electrical distribution, a high tension supply line, a transformer including a normal primary winding connected to said line and a secondary winding feeding a consumption circuit in combination with regulating means for the voltage of said consumption circuit consisting of means for inducing a controllable voltage in series with said normal primary winding and a second transformer connected to said primary winding at an intermediate point and to said consumption circuit together with means for equalizing variations in the voltage of the secondary winding of said first named transformer, caused by the operation of said regulating means, means for varying the relative voltages supplied to the consumption circuit by the said transformers, said means including means for inducing a secondary voltage proportional to said first mentioned induced voltage.

15. In a system of electrical distribution, a high tension supply line, a transformer including a normal primary winding connected to said line and a secondary winding feeding a consumption circuit, in combination with regulating means for the voltage of said consumption circuit consisting of means for inducing a controllable voltage in series with said normal primary winding and a second transformer connected to said primary winding at an intermediate point and to said consumption circuit together with means for equalizing variations in the voltage of the secondary winding of said first named transformer, caused by the operaton of said regulating means consisting of a transformer excited from said induced voltage in the first named primary.

Signed at New York in the county of New York and State of New York, this 25 day of August A. D. 1924.

PERCY H. THOMAS.